(12) United States Patent
Klimpel et al.

(10) Patent No.: US 9,821,914 B2
(45) Date of Patent: Nov. 21, 2017

(54) AIRCRAFT AIR CONDITIONING SYSTEM AND METHOD OF OPERATING AN AIRCRAFT AIR CONDITIONING SYSTEM

(71) Applicant: Airbus Operations GmbH, Hamburg (DE)

(72) Inventors: Frank Klimpel, Hamburg (DE); Thomas Scherer, Hamburg (DE); Markus Piesker, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 335 days.

(21) Appl. No.: 14/636,388

(22) Filed: Mar. 3, 2015

(65) Prior Publication Data
US 2015/0251764 A1  Sep. 10, 2015

(30) Foreign Application Priority Data
Mar. 7, 2014  (EP) .................................... 14158246

(51) Int. Cl.
*B64D 13/06*  (2006.01)

(52) U.S. Cl.
CPC ...... *B64D 13/06* (2013.01); *B64D 2013/0688* (2013.01); *Y02T 50/56* (2013.01)

(58) Field of Classification Search
CPC .... B64D 2013/0614; B64D 2013/0688; B64D 2013/0629
See application file for complete search history.

(56) References Cited

U.S. PATENT DOCUMENTS

| | | | |
|---|---|---|---|
| 5,513,500 A | 5/1996 | Fischer et al. | |
| 2007/0137234 A1* | 6/2007 | Zywiak | B64D 13/06 62/239 |
| 2009/0000329 A1 | 1/2009 | Colberg et al. | |
| 2009/0084896 A1* | 4/2009 | Boucher | B64D 13/08 244/118.5 |
| 2010/0101251 A1 | 4/2010 | Kelnhofer | |
| 2010/0251737 A1 | 10/2010 | Roering | |

FOREIGN PATENT DOCUMENTS

| | | |
|---|---|---|
| DE | 4340317 C2 | 6/1995 |
| DE | 102008053320 A1 | 5/2010 |
| DE | 102009011797 A1 | 9/2010 |

(Continued)

OTHER PUBLICATIONS

European Patent Office, European Search Report for European Patent No. 14158246 dated Aug. 18, 2014.

*Primary Examiner* — Cassey D Bauer
(74) *Attorney, Agent, or Firm* — Lorenz & Kopf, LLP

(57) ABSTRACT

An aircraft air conditioning system comprises a process air source and an air conditioning unit being connected to the process air source via a process air line and being adapted to cool and expand process air supplied to the air conditioning unit from the process air source so as to provide conditioned air. A mixing chamber of the aircraft air conditioning system is connected to the air conditioning unit via a conditioned air line and is adapted to mix conditioned air supplied to the mixing chamber from the air conditioning unit with recirculation air recirculated from an aircraft region to be air conditioned to the mixing chamber via a recirculation air line so as to provide mixed air.

15 Claims, 2 Drawing Sheets

(56) References Cited

FOREIGN PATENT DOCUMENTS

| | | |
|---|---|---|
| DE | 102010054448 A1 | 6/2012 |
| DE | 102011118078 A1 | 5/2013 |
| EP | 2597036 A2 | 5/2013 |
| EP | 2647571 A1 | 10/2013 |
| EP | 2650218 A1 | 10/2013 |
| GB | 2389864 A | 12/2003 |
| JP | 2001328596 A | 11/2001 |
| WO | 2007088012 A1 | 8/2007 |
| WO | 2012079756 A2 | 6/2012 |

* cited by examiner

AIRCRAFT AIR CONDITIONING SYSTEM AND METHOD OF OPERATING AN AIRCRAFT AIR CONDITIONING SYSTEM

CROSS-REFERENCE TO RELATED APPLICATION

This application claims priority to European Patent Application No. 14 158 26.0 filed 7 Mar. 2014 which incorporated herein by reference in its entirety.

TECHNICAL FIELD

So-called air-based air conditioning systems, as described for example in DE 10 2008 053 320 A1 and US 2010/101251 A1 or DE 10 2010 054 448 A1 and WO 2012/079756 A2, are usually used at present in commercial aircraft to air-condition the aircraft cabin. An aircraft air conditioning system serves to adequately cool or heat the aircraft cabin and to adequately supply fresh air into the aircraft cabin to ensure that a prescribed minimum proportion of oxygen is present in the aircraft cabin. Moreover, during flight operation of the aircraft, the aircraft air conditioning system is used to pressurize the aircraft cabin so as to maintain the pressure within the aircraft cabin, compared to the ambient pressure at the cruising altitude of the aircraft, at an elevated level.

BACKGROUND

Air-based air conditioning systems typically comprise an air conditioning unit, which is arranged, for example, in a wing root of the aircraft, and which is supplied with compressed process air that is generated by a compressor or bled off from an engine or an auxiliary power unit (APU) of the aircraft. During flight operation of the aircraft, usually engine bleed air is used so as to supply the air conditioning unit of the aircraft air conditioning system with compressed process air. During ground operation of the aircraft the air conditioning unit of the aircraft air conditioning system, however, typically is supplied with compressed process air from the auxiliary power unit of the aircraft. In the air conditioning unit, the process air, upon flowing through at least one heat exchanger as well as through various compression and expansion units, is cooled and expanded.

The heat exchanger(s) of the air conditioning unit is/are cooled by ambient air provided to the heat exchanger(s) via a ram air channel. During flight operation of the aircraft, ambient air is conveyed through the ram air channel due to a pressure difference building up between a ram air channel inlet and a ram air channel outlet. During ground operation of the aircraft, a conveying device such as, for example, a fan is operated in order to provide for a sufficient mass flow of ambient air through the ram air channel. Cooled process air exiting the air conditioning unit finally is supplied to a mixing chamber where it is mixed with recirculation air recirculated from an aircraft region to be air conditioned. The mixed air from the mixing chamber, via respective mixed air lines, is supplied to the aircraft region to be air conditioned such as, for example a passenger cabin which may be divided into a plurality of air conditioning zones or a cargo compartment.

In addition, commercial passenger aircraft usually are equipped with a so-called supplemental cooling system which serves to cool, for example, food that is stored on board the aircraft in the region of the aircraft galleys either in cooled galley compartments or mobile trolleys. Moreover, the supplemental cooling system may be used to cool heat generating components such as, for example, electric or electronic components on board the aircraft. Supplemental cooling systems as described, for example, in DE 43 40 317 C2 and U.S. Pat. No. 5,513,500, in EP 1 979 233 B1 and US 2009/000329 A1, in DE 10 2006 005 035 A1 and WO 2007/088012 A1 or in DE 10 2009 011 797 A1 and US 2010/0251737 A1 comprise a plurality of cooling stations which are arranged close to the cooling energy consumers, for example in the galley regions of the aircraft, and which are provided with cooling energy from a central refrigerating device. The cooling stations are thermally connected to the central refrigerating device via a cooling circuit which is operated with either a one-phase liquid refrigerant or a two-phase refrigerant, which upon taking up heat from the cooling stations is transferred from the liquid state of aggregation to the gaseous state of aggregation and which again is transferred back from the gaseous state of aggregation to the liquid state of aggregation due to the transfer of cooling energy generated by the central refrigerating device.

The embodiments described herein are directed at the object of providing an aircraft air conditioning system which is operable with high energy efficiency and thus reduces the fuel consumption of an aircraft equipped with the aircraft air conditioning system. Further, the embodiments are directed to provide a method of operating an aircraft air conditioning system of this kind.

An aircraft air conditioning system comprises a process air source. The process air source preferably is adapted to provide process air at an elevated pressure, for example at a pressure of about 2 bar. Furthermore, the process air provided by the process air source may have a temperature of about +200° C. The aircraft air conditioning system may use an engine or an auxiliary power unit as the process air source. In particular, the aircraft air conditioning system may be provided with process air from an engine of the aircraft during flight operation of the aircraft. During ground operation of the aircraft, the aircraft air conditioning system preferably is provided with process air from an auxiliary power unit of the aircraft or an aircraft external ground support equipment.

An air conditioning unit of the aircraft air conditioning system is connected to the process air source via a process air line. A flow control valve may be provided in the process air line for controlling a mass flow of the process air through the process air line. The air conditioning unit is adapted to cool and expand process air supplied to the air conditioning unit from the process air source so as to provide conditioned air. For example, the air conditioning unit may comprise at least one heat exchanger as well as compression and expansion units. The at least one heat exchanger of the air conditioning unit may be arranged within a ram air channel or may be otherwise provided with ram air in order to discharge heat from the heat exchanger. The conditioned air exiting the air conditioning unit typically has a temperature of approximately −20° C. and a pressure of approximately 1 bar. Furthermore, as compared to the mass flow of the process air through the process air line, the mass flow of the conditioned air exiting the air conditioning unit is low.

The aircraft air conditioning system further comprises a mixing chamber which is connected to the air conditioning unit via a conditioned air line. The mixing chamber is adapted to mix conditioned air supplied to the mixing chamber from the air conditioning unit with recirculation air recirculated from an aircraft region to be air conditioned via a recirculation air line so as to provide mixed air. The aircraft region to be air conditioned which is supplied with mixed air from the mixing chamber may, for example, be a passenger cabin and/or a cargo compartment of the aircraft. A suitable conveying device such as, for example, a recirculation fan, may be disposed in the recirculation air line in order to convey recirculation air discharged from the aircraft region to be air conditioned, for example the passenger cabin of the aircraft, to the mixing chamber. Within the mixing chamber, conditioned air and recirculation air may be mixed in dependence on the ambient conditions, the operating state of the air conditioning unit and/or the cooling demand of the aircraft region to be air conditioned in such a manner that mixed air to be supplied to the aircraft region to be air conditioned is provided at a desired set temperature and with a desired set mass flow rate.

A mixed air line connects the mixing chamber to the aircraft region to be air conditioned. The mixed air line is adapted to supply mixed air provided by the mixing chamber to the aircraft region to be air conditioned. For example, the mixed air line may connect the mixing chamber to a passenger cabin and/or a cargo compartment of the aircraft. The mixed air line may be connected to the process air line via a first trim air line. Via the first trim air line, process air provided by the process air source, i.e. for example bleed air bled off from an engine or an auxiliary power unit of the aircraft or process air provided by a ground support equipment, may be supplied to the mixed air line downstream of the mixing chamber in order to adjust the temperature and/or the mass flow rate of the mixed air before finally being supplied to the aircraft region to be air conditioned.

The aircraft air conditioning system according to the invention further comprises at least one heat exchanger which is adapted to establish a thermal coupling between the aircraft air conditioning system and an external cooling energy source. Further, the heat exchanger is adapted to transfer cooling energy provided by the external cooling energy source to the aircraft air conditioning system. As compared to prior art systems, the aircraft air conditioning system according to the invention thus is not limited to the use of the air conditioning unit as the only cooling energy source. Instead, the aircraft air conditioning system, via the heat exchanger, at least in certain operational states of the aircraft air conditioning system, may be supplied with additional cooling energy provided by the external cooling energy source. For example, the external cooling energy source may be used to supply cooling energy to the aircraft air conditioning system during a peak load operational state of the aircraft air conditioning system thus allowing an appropriate adjustment of the overall layout of the aircraft air conditioning system. As a result, the aircraft air conditioning system can be designed more lightweight and operated more efficiently.

Furthermore, during flight operation of an aircraft equipped with the aircraft air conditioning system, due to the external cooling energy source providing additional cooling energy to the aircraft air conditioning system, the ram air demand of the air conditioning unit of the air conditioning system can be reduced. As a result, the aerodynamic drag caused by the ram air channel supplying ram air to the heat exchanger(s) of the air conditioning unit and hence the fuel consumption of the aircraft can be reduced. Moreover, a lower cooling energy demand allows a reduction of the mass flow rate of process air supplied from the process air source to the air conditioning unit of the air conditioning system. As a consequence, less bleed air has to be bled off the main engines of the aircraft during flight operation, thus allowing an increase of the efficiency of the engines. During ground operation of the aircraft, a lower process air demand allows the realisation of energy savings for operating the auxiliary power unit and/or an external ground support equipment.

In principle, the aircraft air conditioning system may be supplied with additional cooling energy from various types of external cooling energy sources. The aircraft air conditioning system may be provided with only one heat exchanger which is adapted to establish a thermal coupling between the aircraft air conditioning system and only one external cooling energy source. It is, however, also conceivable to provide the aircraft air conditioning system with a plurality of heat exchangers which are adapted to establish a thermal coupling between the aircraft air conditioning system and a single external cooling energy source or a plurality of (various) external cooling energy sources. Preferably, a system is used as the external cooling energy source which is already present on board the aircraft and which, at least during certain operational states of the aircraft, has excess cooling capacities which may be allocated to the aircraft air conditioning system.

In a preferred embodiment, the aircraft air conditioning system comprises at least one first heat exchanger which is adapted to establish a thermal coupling between the aircraft air conditioning system and a supplemental cooling system of the aircraft. If desired, a plurality of first heat exchangers may be provided which may be arranged at different positions in the aircraft air conditioning system so as to supply cooling energy provided by the supplemental cooling system to the aircraft air conditioning system at different positions. The supplemental cooling system may comprise at least one cooling station which is adapted to provide cooling energy to a cooling energy consumer installed on board an aircraft. The cooling energy consumer may, for example, be a galley region to be cooled, i.e. for example a galley compartment or a mobile trolley which is used for storing food to be supplied to the passengers on board the aircraft. It is, however, also conceivable that a cooling station of the supplemental cooling system serves to cool heat generating components, for example electric or electronic components installed on board the aircraft. Typically, the supplemental cooling system comprises a plurality of cooling stations which may be arranged in a forward region and/or an aft region of the aircraft cabin.

Furthermore, the supplemental cooling system may comprise a central refrigerating device which is thermally coupled to the at least one cooling station via a cooling circuit. The central refrigerating device may be installed, for example, in the region of a Belly Fairing of the aircraft, i.e. remote from the cooling stations. For example, the central refrigerating device may be designed in the form of a vapour-compression refrigeration device. The cooling circuit may allow the circulation of a one-phase liquid refrigerant or the circulation of a two-phase refrigerant therethrough.

Typically, the supplemental cooling system of an aircraft is designed to be able to provide a sufficient amount of cooling energy to the cooling energy consumers associated with the supplemental cooling system also during ground operation of the aircraft when the aircraft air conditioning system is not running. In other words, the supplemental cooling system is designed so as to be capable of cooling for example the galley regions of the aircraft when the aircraft is on the ground also on hot days when the temperature within the aircraft cabin may exceed 50° C. as long as the aircraft air conditioning system is not in operation. As a consequence, the supplemental cooling system, during flight operation of the aircraft, when the aircraft air conditioning system is running anyway, typically has excess cooling capacities which, via the at least one first heat exchanger, can be allocated to the aircraft air conditioning system.

The at least one first heat exchanger may be adapted to establish a thermal coupling between the aircraft air conditioning system and the cooling circuit of the supplemental cooling system. The installation position of the first heat exchanger then can be selected in a rather flexible way anywhere in the cooling circuit of the supplemental cooling system. In addition, a thermal coupling between the heat exchanger and the cooling circuit can be realized in a simple manner with the aid of suitable control valves which are adapted to control the supply of refrigerant flowing through the cooling circuit to the first heat exchanger. If desired, the cooling circuit of the supplemental cooling system may be provided with an additional bypass line such that the refrigerant flowing through the cooling circuit of the supplemental cooling system may be directed to the first heat exchanger or not as desired.

Preferably, the at least one first heat exchanger is adapted to establish a thermal coupling between the aircraft air conditioning system and the cooling circuit of the supplemental cooling system downstream of the cooling station and upstream of the central refrigerating device, i.e. in a return flow path of the cooling circuit. Refrigerant exiting the cooling station of the supplemental cooling system typically has a temperature which is still low enough to discharge heat from the aircraft air conditioning system. Moreover, since the refrigerant, after taking up heat from the aircraft air conditioning system in the first heat exchanger, is supplied to the central refrigerating device, by suitably controlling the operation of the central refrigerating device, a negative impact on the cooling performance of the cooling station can be prevented, since the refrigerant, in the central refrigerating device, may then be cooled to a desired low temperature before again being supplied to the cooling station. Finally, supplying the refrigerant to the refrigerating device of the supplemental cooling system at a higher temperature allows an increase in the operational efficiency of the refrigerating device and hence the overall supplemental cooling system.

Preferably, the at least one first heat exchanger is arranged in the mixed air line and/or the recirculation air line of the aircraft air conditioning system. Of course, one first heat exchanger may be arranged in the mixed air line and one first heat exchanger may be arranged in the recirculation air line of the aircraft air conditioning system. Alternatively or additionally thereto, the first heat exchanger may be arranged in a connecting line of the aircraft air conditioning system which connects a first aircraft region to be air conditioned, for example a passenger cabin of the aircraft, to a second aircraft region to be air conditioned, for example a cargo compartment of the aircraft, and which is adapted to supply air discharged from the first aircraft region to be air conditioned to the second region to be air conditioned. The mixed air flowing through the mixed air line, the recirculation air flowing through the recirculation air line and the air discharged from the first aircraft region to be air conditioned and flowing through the connecting line has a temperature which is higher than the temperature of the refrigerant flowing through the return flow path of the cooling circuit of the supplemental cooling system after exiting the cooling station. The refrigerant therefore may be used to efficiently discharge heat from the mixed air, the recirculation air and the air discharged from the first aircraft region to be air conditioned. Furthermore, the mass flow rate of the mixed air flowing through the mixed air line, the recirculation air flowing through the recirculation air line and the air discharged from the first aircraft region to be air conditioned and flowing through the connecting line is within a range that allows the mixed air, the recirculation air and the air discharged from the first aircraft region to be air conditioned to be cooled by heat transfer to the refrigerant circulating in the cooling circuit of the supplemental cooling system.

In a preferred embodiment, the aircraft air conditioning system further comprises a control unit which is adapted to control the operation of the aircraft air conditioning system and the supplemental cooling system in such a manner that the cooling energy provided by the refrigerating device of the supplemental cooling system is supplied exclusively to the cooling station of the supplemental cooling system until a temperature of the cooling energy consumer supplied with cooling energy by the cooling station has reached a predetermined set temperature. Further, the control unit may be adapted to control the operation of the aircraft air conditioning system and the supplemental cooling system in such a manner that at least a part of the cooling energy provided by the refrigerating device of the supplemental cooling system is allocated to the aircraft air conditioning system when the temperature of the cooling energy consumer supplied with cooling energy by the cooling station has reached the predetermined set temperature.

This control strategy ensures that the primary task of the supplemental cooling system, providing cooling energy to the cooling energy consumer associated with the supplemental cooling system, is not affected by allocating cooling energy generated by the refrigerating device of the supplemental cooling system to the aircraft air conditioning system. Instead, a cooling energy allocation takes place only when sufficient cooling of the cooling energy consumer is ensured.

Alternatively or additionally thereto, the control unit may be adapted to control the operation of the aircraft air conditioning system and the supplemental cooling system in such a manner that the cooling energy provided by the refrigerating device of the supplemental cooling system is supplied exclusively to the cooling station of the supplemental cooling system until a change in the cooling performance of the supplemental cooling system over a predetermined period of time falls below a predetermined threshold value. Furthermore, the control unit may be adapted to control the operation of the aircraft air conditioning system and the supplemental cooling system in such a manner that at least a part of the cooling energy provided by the refrigerating device of the supplemental cooling system is allocated to the aircraft air conditioning system when the change in the cooling performance of the supplemental cooling system over a predetermined period of time has fallen below the predetermined threshold value.

This control strategy ensures that cooling energy generated by the refrigerating device of the supplemental cooling system is allocated to the aircraft air conditioning system only when the performance of the supplemental cooling system has converged to a stationary stage, i.e. only little changes in the performance of the supplemental cooling system over time occur. When the cooling performance of the supplemental cooling system is more or less constant, a more or less constant amount of cooling energy can be allocated to the aircraft air conditioning system allowing the aircraft air conditioning system to be operated also at a stationary state with almost constant performance. The operational efficiency of the aircraft air conditioning system thus can be maximized.

The operation of the aircraft air conditioning system and the supplemental cooling system can be controlled according to only one of the above described cooling strategies. It is, however, also conceivable to switch between the two control strategies as desired. For example, upon start-up of the aircraft air conditioning system and the supplemental cooling system, first the "single load" control strategy can be performed wherein cooling energy generated by the refrigerating device of the supplemental cooling system is supplied exclusively to the cooling station of the supplemental cooling system until a temperature of the cooling energy consumer supplied with cooling energy by the cooling station has reached a predetermined set temperature. When both, the aircraft air conditioning system and the supplemental cooling system, have reached a more or less stationary operational state, the control strategy may be changed to the "load sharing mode", wherein cooling energy generated by the refrigerating device of the supplemental cooling system is allocated to the aircraft air conditioning system, provided a change of the cooling performance of the supplemental cooling system over a predetermined period of time is below a predetermined threshold value. However, independent of the selected control strategy, during operation of the aircraft air conditioning system and the supplemental cooling system, the cooling energy demand of the cooling energy consumer associated with the supplemental cooling system should be prioritized over the cooling energy demand of the aircraft air conditioning system so as to ensure that the cooling energy consumer is sufficiently cooled.

The control unit further may be adapted to control the operation of the aircraft air conditioning system in dependence on the cooling energy amount allocated to the aircraft air conditioning system from the external cooling energy source. For example, the control unit may be adapted to reduce the cooling energy output of the air conditioning unit of the aircraft air conditioning system in dependence on the amount of cooling energy transferred to the aircraft air conditioning system from the external cooling energy source.

The aircraft air conditioning system may further comprise at least one second heat exchanger which is designed in the form of a skin heat exchanger, i.e. a heat exchanger which forms a part of the aircraft outer skin and hence is cooled by the ambient air flowing over the aircraft outer skin. A second heat exchanger designed in the form of a skin heat exchanger thus is adapted to establish a thermal coupling between the aircraft air conditioning system and ambient air. In this embodiment of the aircraft air conditioning system, the external cooling energy source thus is the ambient air cooling the skin heat exchanger. A second heat exchanger designed in the form of a skin heat exchanger preferably is arranged in the process air line of the aircraft air conditioning system where the air has a high temperature, a high pressure and a high mass flow rate. The aircraft air conditioning system may be equipped with only at least one second heat exchanger. It is, however, also conceivable to use the ambient air, beside the supplemental cooling system of the aircraft, as a second external cooling energy source.

Furthermore, the aircraft air conditioning system may comprise at least one third heat exchanger which is adapted to establish a thermal coupling to a refrigerating device and/or a heat pump. In this embodiment, the refrigerating device and/or the heat pump act(s) as the external cooling energy source, wherein the refrigerating device and/or the heat pump may constitute the only external cooling energy source providing additional cooling energy to the aircraft air conditioning system or may be provided in addition to the supplemental cooling system and/or the ambient air as described above. The at least one third heat exchanger may be arranged in the conditioned air line and/or a conditioned air branch line branching off from the conditioned air line and connecting the conditioned air line to the aircraft region to be air conditioned, in particular a second aircraft region to be air conditioned which is constituted by the cargo compartment of the aircraft. As already indicated above, the temperature of the conditioned air flowing through the conditioned air line and/or the conditioned air branch line has a temperature of approximately −20°. The refrigerating device and/or the heat pump therefore should be designed so as to be able to cool the conditioned air to such a low temperature. As compared to a refrigerating device, a heat pump has the advantage that it may also be operated so as to heat the conditioned air flowing through the conditioned air line and/or the conditioned air branch line, if required.

A method of operating an aircraft air conditioning system comprises the steps of supplying process air from a process air source to an air conditioning unit via a process air line, cooling and expanding process air by the air conditioning unit so as to provide conditioned air, and supplying conditioned air from the air conditioning unit to a mixing chamber via a conditioned air line. The conditioned air supplied to the mixing chamber from the air conditioning unit is mixed with recirculation air recirculated from an aircraft region to be air conditioned to the mixing chamber via a recirculation air line so as to provide mixed air. From the mixing chamber, mixed air is supplied to the aircraft region to be air conditioned via a mixed air line. A thermal coupling is established between the aircraft air conditioning system and an external cooling energy source by means of at least one heat exchanger. Cooling energy provided by the external cooling energy source is transferred to the aircraft air conditioning system via the at least one heat exchanger.

At least one first heat exchanger may establish a thermal coupling between the aircraft air conditioning system and a supplemental cooling system. The supplemental cooling system may comprise at least one cooling station being adapted to provide cooling energy to a cooling energy consumer installed on board the aircraft and a central refrigerating device being thermally coupled to the cooling station via a cooling circuit.

The at least one first heat exchanger may establish a thermal coupling between the aircraft air conditioning system and the cooling circuit of the supplemental cooling system, preferably downstream of the cooling station and upstream of the central refrigerating device.

The at least one first heat exchanger may be arranged in the mixed air line, the recirculation air line and/or a connecting line connecting a first aircraft region to be air conditioned to a second aircraft region to be air conditioned and being adapted to supply air discharged from the first aircraft region to be air conditioned to the second aircraft region to be air conditioned.

The operation of the aircraft air conditioning system and the supplemental cooling system may be controlled in such a manner that the cooling energy provided by the refrigerating device of the supplemental cooling system is supplied exclusively to the cooling station of the supplemental cooling system until a temperature of the cooling energy consumer supplied with cooling energy by the cooling station has reached a predetermined set temperature, and that at least a part of the cooling energy provided by the refrigerating device of the supplemental cooling system is allocated to the aircraft air conditioning system when the temperature of the cooling energy consumer supplied with cooling energy by the cooling station has reached the predetermined set temperature.

Alternatively or additionally thereto, the operation of the aircraft air conditioning system and the supplemental cooling system may be controlled in such a manner that the cooling energy provided by the refrigerating device of the supplemental cooling system is supplied exclusively to the cooling station of the supplemental cooling system until a change in the performance of the supplemental cooling system over a predetermined period of time falls below a predetermined threshold value, and that at least a part of the cooling energy provided by the refrigerating device of the supplemental cooling system is allocated to the aircraft air conditioning system when the change in the cooling performance of the supplemental cooling system over a predetermined period of time has fallen below the predetermined threshold value.

Preferably, the operation of the aircraft air conditioning system is controlled in dependence on the cooling energy amount supplied to the aircraft air conditioning system from the external cooling energy source.

At least one second heat exchanger may be designed in the form of a skin heat exchanger which establishes a thermal coupling to ambient air. The at least one second heat exchanger preferably is arranged in the process air line.

Preferably, at least one third heat exchanger is provided which establishes a thermal coupling to a refrigerating device and/or a heat pump. The at least one third heat exchanger preferably is arranged in the conditioned air line and/or a conditioned air branch line branching off from the conditioned air line and connecting the conditioned air line to the aircraft region to be air conditioned.

A preferred embodiment will now is described in greater detail with reference to the appended schematic drawings, wherein

DETAILED DESCRIPTION

Figure 1:
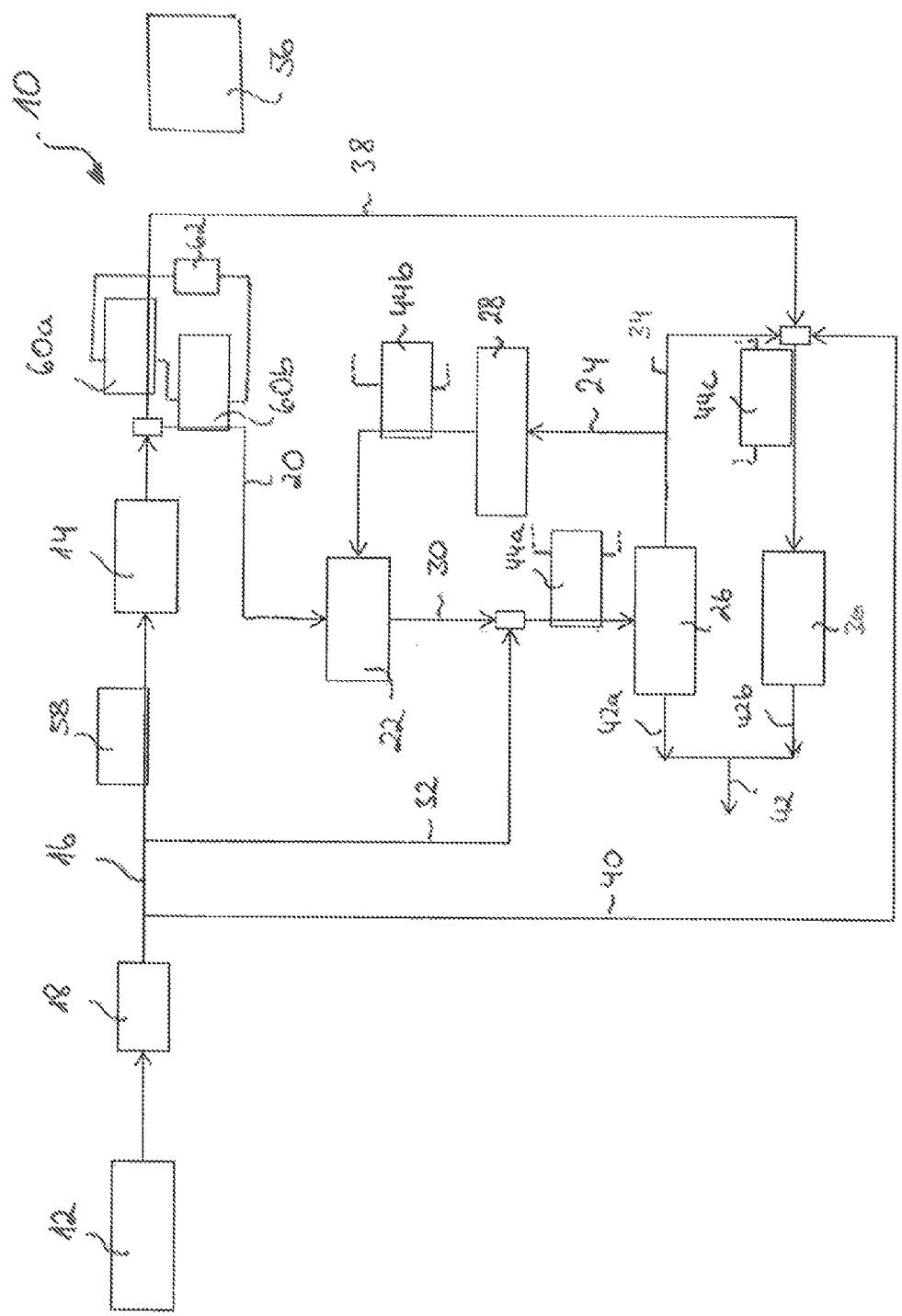
FIG. 1 shows a schematic representation of an aircraft air conditioning system.

FIG. 1 shows an aircraft air conditioning system 10 which comprises a process air source 12 providing process air at an elevated pressure of approximately 2 bar and at an elevated temperature of approximately +200° C. During flight operation of an aircraft equipped with the aircraft air conditioning system 10, the aircraft air conditioning system 10 uses a main engine of the aircraft as the process air source 12. During ground operation of the aircraft, an auxiliary power unit of the aircraft and/or an external ground support equipment act(s) as the process air source 12. The process air source 12 is connected to an air conditioning unit 14 via a process air line 16. A flow control valve 18 serves to control the flow of process air through the process air line 16.

The air conditioning unit 14 is adapted to cool and expand the process air supplied to the air conditioning unit 14 from the process air source 12 and comprises various compression and expansion units as well as at least one heat exchanger arranged in a ram air channel of the aircraft (not shown). Conditioned air exiting the air conditioning unit 14 has a temperature of approximately −20° C. and a pressure of approximately 1 bar. The conditioned air, via a conditioned air line 20, is supplied to a mixing chamber 22. Within the mixing chamber 22, the conditioned air is mixed with recirculation air flowing through a recirculation air line 24. The recirculation air flowing through the recirculation air line 24 is discharged from a first aircraft region 26 to be air conditioned which is formed by a passenger cabin of the aircraft. A conveying device 28 designed in the form of a fan serves to convey the recirculation air discharged from the first aircraft region 26 to be air conditioned to the mixing chamber 22.

Mixed air generated in the mixing chamber 22, via a mixed air line 30, finally is supplied to the first aircraft region 26 to be air conditioned. Basically, the flow of conditioned air and recirculation air to the mixing chamber 22 is controlled in such a manner that the mixed air exiting the mixing chamber 22 has a desired temperature and mass flow rate. Fine adjustment of the temperature of the mixed air flowing through the mixing air line 30 is possible by supplying hot process air from the process air source 12 to the mixed air line 30 via a first trim line 32.

A connecting line 34 connects the first aircraft region 26 to be air conditioned to a second aircraft region 36 to be air conditioned which is formed by a cargo compartment of the aircraft. Thus, the second aircraft region 36 to be air conditioned is supplied with air discharged from the first aircraft region 26 to be air conditioned. It is, however, also conceivable to connect also the second aircraft region 36 to be air conditioned to the mixing chamber 22 so as to provide also the second aircraft region 36 to be air conditioned with mixed air generated in the mixing chamber 22. The air discharged from the first aircraft region 26 to be air conditioned may be mixed, as desired, with conditioned air supplied to the connecting line 34 via a conditioned air branch line 38 branching off from the conditioned air line 20 and/or trim air supplied to the connecting line 34 via a second trim air line 40 branching off from the process air line 16. The first and the second aircraft region 26, 36 to be air conditioned are connected to the ambient via an outflow line 42 having respective outflow line branches 42a, 42b connected to the first aircraft region 26 to be air conditioned and the second aircraft region 36 to be air conditioned, respectively.

In the mixed air line 30 connecting the mixing chamber 22 to the first aircraft region 26 to be air conditioned, a first heat exchanger 44a is arranged. The first heat exchanger 44a is adapted to establish a thermal coupling between the aircraft air conditioning system 10, i.e. the mixed air flowing through the mixed air line 30, and an external cooling energy source so as to transfer cooling energy provided by the external cooling energy source to the aircraft air conditioning system 10, i.e. the mixed air flowing through the mixed air line 30. A further first heat exchanger 44b is arranged in the recirculation air line 24 and is adapted to establish a thermal coupling between the aircraft air conditioning system 10, i.e. the recirculation air flowing through the recirculation air line 24, so as to transfer cooling energy provided by the external cooling energy source to the aircraft air conditioning system 10, i.e. the recirculation air flowing through the recirculation air line 24. Still a further first heat exchanger 44c is arranged in the connecting line 34 connecting the first aircraft region 26 to be air conditioned to the second aircraft region 36 to be air conditioned downstream of a line junction where the conditioned air branch line 38 and the second trim air line 40 open into the connecting line 34. Also this first heat exchanger 44c is adapted to establish a thermal coupling between the aircraft air conditioning system 10, i.e. the air flowing through the connecting line 34 and an external cooling energy source so as to transfer cooling energy provided by the external cooling energy source to the aircraft air conditioning system 10, i.e. the air flowing through the connecting line 34.

Figure 2:
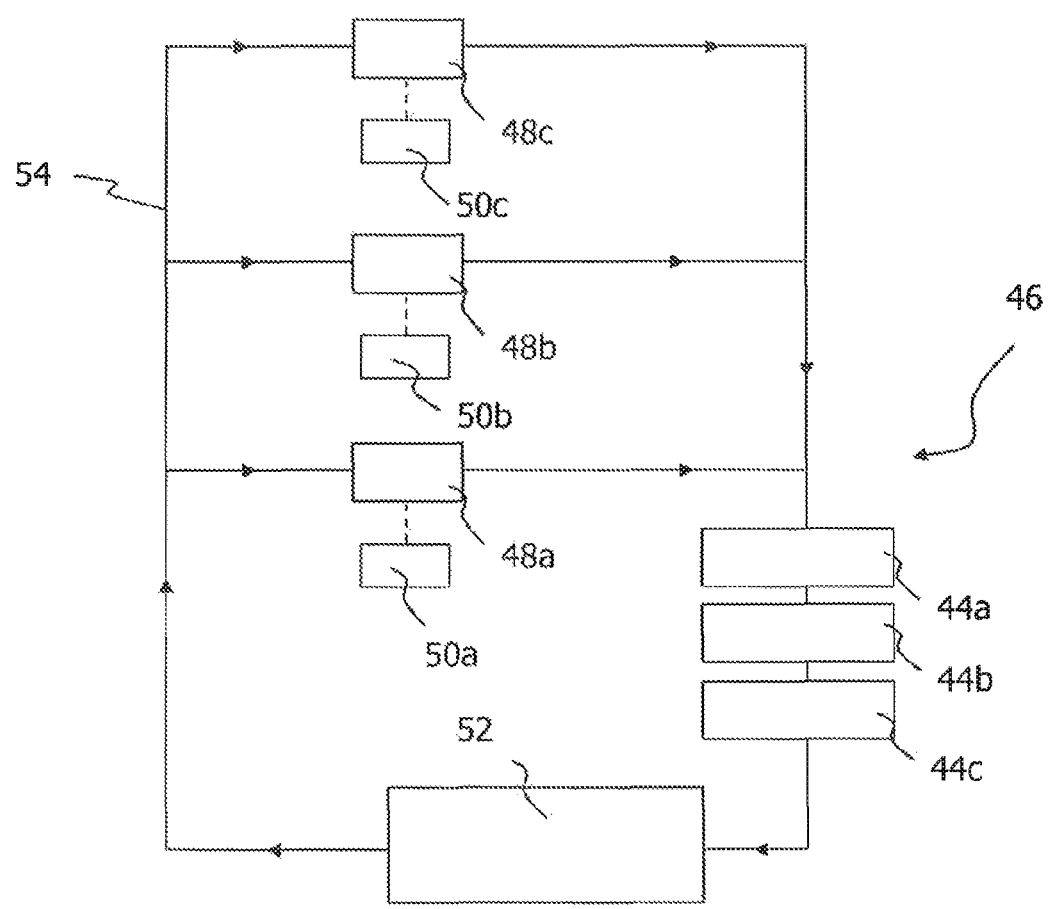
FIG. 2 shows a schematic representation of a supplemental cooling system which may be thermally coupled to the aircraft air conditioning system of FIG. 1.

In case of all three first heat exchangers 44a, 44b, 44c, the external cooling energy source is a supplemental cooling system 46 of the aircraft which is depicted in greater detail in FIG. 2. The supplemental cooling system 46 comprises a plurality of cooling stations 48a, 48b, and 48c. Each cooling station 48a, 48b, 48c may be designed in the form of an evaporator and is adapted to provide cooling energy to a cooling energy consumer 50a, 50b, 50c installed on board the aircraft. The cooling energy consumers 50a, 50b, 50c associated with the supplemental cooling system 46 may, for example, be galley regions of the aircraft to be cooled and/or heat generating components such as, for example, electric or electronic components. The supplemental cooling system 46 further comprises a central refrigerating device 52 which is thermally coupled to the cooling stations 48a, 48b, and 48c via a cooling circuit 54.

The cooling circuit 54 is adapted for operation with a two-phase refrigerant which, during taking up heat from the cooling energy consumers 50a, 50b, 50c in the cooling stations 48a, 48b, and 48c is transferred from the liquid state of aggregation to the gaseous state of aggregation. Upon being cooled again while being in thermal contact with an internal cooling circuit of the central refrigerating device 52, the refrigerant circulating in the cooling circuit 54 again is transferred back from the gaseous state of aggregation to the liquid state of aggregation. Alternatively, it is, however, also conceivable to operate the cooling circuit 54 of the supplemental cooling system 46 with a liquid refrigerant.

The first heat exchangers 44a, 44b, 44c which serve to transfer cooling energy provided by the central refrigerating device 52 of the supplemental cooling system 46 to the aircraft air conditioning system 10 are arranged in the cooling circuit 54 of the supplemental cooling system 46 downstream of the cooling stations 48a, 48b, 48c and upstream of the central refrigerating device 52, i.e. in a return flow path of the cooling circuit 54. Downstream of the cooling stations 48a, 48b, 48c, the refrigerant circulating through the cooling circuit 54 still has a temperature which is low enough to effectively cool the mixed air flowing through the mixed air line 30, the recirculation air flowing through the recirculation air line 24 and the air flowing through the connecting line 34 of the aircraft air conditioning system 10. Furthermore, first heat exchangers 44a, 44b, 44c arranged in a return flow path of the cooling circuit 54 do not affect the cooling energy supply to the cooling stations 48a, 48b, and 48c. Finally, upon flowing through the first heat exchangers 44a, 44b, 44c, the refrigerant circulating in the cooling circuit 54 is further heated and thus can be supplied to the central refrigerating device 52 at a higher temperature.

The supply of refrigerant to the first heat exchangers 44a, 44b, and 44c can be controlled by appropriate control valves (not shown). Furthermore, bypass lines may be provided which allow the first heat exchangers 44a, 44b, 44c to be bypassed, if required. In FIG. 2 the first heat exchangers 44a, 44b, 44c are arranged in the cooling circuit 54 of the supplemental cooling system 46 in a serial order. It is, however, also conceivable to arrange the first heat exchangers 44a, 44b, 44c in the cooling circuit 54 of the supplemental cooling system 46 parallel to each other.

A control unit 56 serves to control the operation of the aircraft air conditioning system 10 and the supplemental cooling system 46. Upon start-up of the operation of the aircraft air conditioning system 10 and the supplemental cooling system 46, the control unit 56 controls the operation of the aircraft air conditioning system 10 and the supplemental cooling system 46 in such a manner that the cooling energy provided by the refrigerating device 52 of the supplemental cooling system 46 is supplied exclusively to the cooling stations 48a, 48b, 48c of the supplemental cooling system 46 until a temperature of the cooling energy consumers 50a, 50b, 50c supplied with cooling energy by the cooling stations 48a, 48b, 48c has reached a predetermined set temperature. Only after the temperature of the cooling energy consumers 50a, 50b, 50c has reached the predetermined set temperature, at least a part of the cooling energy provided by the refrigerating device 52 of the supplemental cooling system 46 is allocated to the aircraft air conditioning system 10 via the first heat exchangers 44a, 44b, 44c. This control strategy ensures that sufficient cooling energy is provided to the cooling energy consumers 50a, 50b, 50c.

Later, i.e. during a stationary operational state of the aircraft air conditioning system 10 and the supplemental cooling system 46, the control unit 56 controls the operation of the aircraft air conditioning system 10 and the supplemental cooling system 46 in such a manner that the cooling energy provided by the refrigerating device 52 of the supplemental cooling system 46 is supplied exclusively to the cooling stations 48a, 48b, 48c of the supplemental cooling system 46 until a change in the cooling performance of the supplemental cooling system 46 over a predetermined period of time falls below a predetermined threshold value. Only in case the change in the cooling performance of the supplemental cooling system 46 over a predetermined period of time is below the predetermined threshold value, at least a part of the cooling energy provided by the central refrigerating device 52 of the supplemental cooling system 46 is allocated to the aircraft air conditioning system 10. Such a control strategy ensures that the aircraft air conditioning system 10 is provided with a more or less constant amount of cooling energy from the supplemental cooling system 46 allowing the aircraft air conditioning system 10 to be operated in an efficient manner. However, during operation of the aircraft air conditioning system 10 and the supplemental cooling system 46, upon distributing the cooling energy provided by the central refrigerating device 52 of the supplemental cooling system 46, the cooling energy consumers 50a, 50b, 50c are prioritized over the transfer of cooling energy to the aircraft air conditioning system 10.

The supplemental cooling system 46 which usually is designed so as to have excess cooling capacities, in particular during flight operation of the aircraft, is particularly suitable to provide cooling energy to the first heat exchangers 44a, 44b, 44c located in the mixed air line 30, the recirculation air line 24 and the connecting line 34.

Therefore, a second heat exchanger 58 which is designed in the form of a skin heat exchanger is arranged in the process air line 16. The second heat exchanger 58 establishes a thermal coupling to the ambient air and thus is particularly suitable to provide cooling energy to the process air which flows through the process air line 16 at a high pressure and which has a high temperature. Thus, by means of the second heat exchanger 58, the aircraft air conditioning system 10, i.e. the process air flowing through the process air line 16 may be thermally coupled to the ambient air acting as the external cooling energy source.

Finally, a third heat exchanger 60a is disposed in the conditioned air branch line 38. A further third heat exchanger 60b is disposed in the conditioned air line 20. The two third heat exchangers 60a, 60b may be formed integral, i.e. incorporated into only one heat exchanger having three flow paths. The third heat exchangers 60a, 60b establish a thermal coupling of the aircraft air condition system 10, i.e. the conditioned air flowing through the conditioned air line 20 and the conditioned air branch line 38, and an additional refrigerating device or heat pump 62 as the external cooling energy source adapted to provide cooling energy to the third heat exchangers 60a, 60b. The refrigerating device or the heat pump 62 has to be designed so as to be able to cool the conditioned air exiting the air conditioning unit 14 to the desired temperature of approximately −20° C. In case the third heat exchangers 60a, 60b are coupled to a heat pump, the heat pump can also be operated so as to heat the conditioned air flowing through the conditioned air line 20 and the conditioned air branch line 38, if desired.

In particular during a stationary operational state of the aircraft air conditioning system 10 and the supplemental cooling system 46, the control unit 56 controls the operation of the aircraft air conditioning system 10 in dependence on the cooling energy amount allocated to the aircraft air conditioning system 10 from the supplemental cooling system 46, the ambient air and the additional refrigerating device or heat pump 62. In particular, the control unit 56 reduces the cooling performance of the air conditioning unit 14 when additional cooling energy is provided by at least one of the external cooling energy sources allowing the supply of ram air and process air to the air conditioning unit 14 to be reduced.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. An aircraft air conditioning system, comprising:
   a process air source,
   an air conditioning unit being connected to the process air source via a process air line and being adapted to cool and expand process air supplied to the air conditioning unit from the process air source so as to provide conditioned air,
   a mixing chamber being connected to the air conditioning unit via a conditioned air line and being adapted to mix conditioned air supplied to the mixing chamber from the air conditioning unit with recirculation air recirculated from an aircraft region to be air conditioned to the mixing chamber via a recirculation air line so as to provide mixed air,
   a mixed air line connecting the mixing chamber to the aircraft region to be air conditioned and supplies mixed air provided by the mixing chamber to the aircraft region to be air conditioned,
   a supplemental cooling system comprising:
      a cooling station that provides cooling energy to a cooling energy consumer installed on board the aircraft, and
      a central refrigerating device being thermally coupled to the cooling station via a cooling circuit,
   at least one heat exchanger that establishes a thermal coupling between the aircraft air conditioning system and the supplemental cooling system to transfer cooling energy provided by the supplemental cooling system to the aircraft air conditioning system, and
   a control unit that controls the operation of the aircraft air conditioning system and the supplemental cooling system in such a manner that the cooling energy provided by the central refrigerating device of the supplemental cooling system is supplied exclusively to the cooling station of the supplemental cooling system until a change in the cooling performance of the supplemental cooling system over a predetermined period of time falls below a predetermined threshold value, and such that at least a part of the cooling energy provided by the central refrigerating device of the supplemental cooling system is allocated to the aircraft air conditioning system when the change in the cooling performance of the supplemental cooling system over a predetermined period of time has fallen below the predetermined threshold value.

2. The aircraft air conditioning system according to claim 1, wherein the at least one heat exchanger establishes a thermal coupling between the aircraft air conditioning system and the cooling circuit of the supplemental cooling system, downstream of the cooling station and upstream of the central refrigerating device.

3. The aircraft air conditioning system according to claim 1,
   wherein the at least one heat exchanger is in the mixed air line, the recirculation air line and/or a connecting line, the connecting line connecting a first aircraft region to be air conditioned to a second aircraft region to be air conditioned and being adapted to supply air discharged from the first aircraft region to be air conditioned to the second aircraft region to be air conditioned.

4. The aircraft air conditioning system according to claim 1,
   wherein the control unit controls the operation of the aircraft air conditioning system and the supplemental cooling system in such a manner that the cooling energy provided by the refrigerating device of the supplemental cooling system is supplied exclusively to the cooling station of the supplemental cooling system until a temperature of the cooling energy consumer supplied with cooling energy by the cooling station has reached a predetermined set temperature, and that at least a part of the cooling energy provided by the refrigerating device of the supplemental cooling system is allocated to the aircraft air conditioning system when the temperature of the cooling energy consumer supplied with cooling energy by the cooling station has reached the predetermined set temperature.

5. The aircraft air conditioning system according to claim 1,
   wherein the control unit controls the operation of the aircraft air conditioning system in dependence on the cooling energy amount supplied to the aircraft air conditioning system from the supplemental cooling system.

6. The aircraft air conditioning system according to claim 1,
wherein at least one additional heat exchanger is a skin heat exchanger adapted to establish a thermal coupling to ambient air.

7. The aircraft air conditioning system according to claim 1,
wherein at least one additional heat exchanger establishes a thermal coupling to at least one of a refrigerating device and a heat pump and is arranged in at least one of the conditioned air line and a conditioned air branch line, the conditioned air branch line branching off from the conditioned air line and connecting the conditioned air line to the aircraft region to be air conditioned.

8. A method of operating an aircraft air conditioning system, the method comprising the steps of:
supplying process air from a process air source to an air conditioning unit via a process air line,
cooling and expanding the process air by the air conditioning unit so as to provide conditioned air,
supplying conditioned air from the air conditioning unit to a mixing chamber via a conditioned air line,
mixing the conditioned air supplied to the mixing chamber from the air conditioning unit with recirculation air recirculated from an aircraft region to be air conditioned to the mixing chamber via a recirculation air line so as to provide mixed air,
supplying mixed air from the mixing chamber to the aircraft region to be air conditioned via a mixed air line,
establishing a thermal coupling between the aircraft air conditioning system and a supplemental cooling system by means of at least one heat exchanger, the supplemental cooling system comprising:
a cooling station that provides cooling energy to a cooling energy consumer installed on board the aircraft, and
a central refrigerating device being thermally coupled to the cooling station via a cooling circuit, and
transferring cooling energy provided by the supplemental cooling system to the aircraft air conditioning system via the at least one heat exchanger,
wherein the operation of the aircraft air conditioning system and the supplemental cooling system is controlled in such a manner that the cooling energy provided by the central refrigerating device of the supplemental cooling system is supplied exclusively to the cooling station of the supplemental cooling system until a change in the cooling performance of the supplemental cooling system over a predetermined period of time falls below a predetermined threshold value, and such that at least a part of the cooling energy provided by the central refrigerating device of the supplemental cooling system is allocated to the aircraft air conditioning system when the change in the cooling performance of the supplemental cooling system over a predetermined period of time has fallen below the predetermined threshold value.

9. The method according to claim 8,
wherein the at least one heat exchanger establishes a thermal coupling between the aircraft air conditioning system and the cooling circuit of the supplemental cooling system, downstream of the cooling station and upstream of the central refrigerating device.

10. The method according to claim 8,
wherein the at least one heat exchanger is arranged in at least one of the mixed air line, the recirculation air line and a connecting line, the connecting line connecting a first aircraft region to be air conditioned to a second aircraft region to be air conditioned and being adapted to supply air discharged from the first aircraft region to be air conditioned to the second aircraft region to be air conditioned.

11. The method according to claim 8,
wherein the operation of the aircraft air conditioning system and the supplemental cooling system is controlled in such a manner that the cooling energy provided by the refrigerating device of the supplemental cooling system is supplied exclusively to the cooling station of the supplemental cooling system until a temperature of the cooling energy consumer supplied with cooling energy by the cooling station has reached a predetermined set temperature, and that at least a part of the cooling energy provided by the refrigerating device of the supplemental cooling system is allocated to the aircraft air conditioning system when the temperature of the cooling energy consumer supplied with cooling energy by the cooling station has reached the predetermined set temperature.

12. The method according to claim 8,
wherein the operation of the aircraft air conditioning system is controlled in dependence on the cooling energy amount supplied to the aircraft air conditioning system from the supplemental cooling system.

13. The method according to claim 8,
wherein at least one additional heat exchanger is designed in the form of a skin heat exchanger which establishes a thermal coupling to ambient air.

14. The method according to claim 8,
wherein at least an additional heat exchanger establishes a thermal coupling to at least one of a refrigerating device and a heat pump and is arranged in at least one of the conditioned air line and a conditioned air branch line, the conditioned air branch line branching off from the conditioned air line and connecting the conditioned air line to the aircraft region to be air conditioned.

15. A method of operating an aircraft air conditioning system, the method comprising the steps of:
supplying process air from a process air source to an air conditioning unit via a process air line,
cooling and expanding the process air by the air conditioning unit so as to provide conditioned air,
supplying conditioned air from the air conditioning unit to a mixing chamber via a conditioned air line,
mixing the conditioned air supplied to the mixing chamber from the air conditioning unit with recirculation air recirculated from an aircraft region to be air conditioned to the mixing chamber via a recirculation air line so as to provide mixed air,
supplying mixed air from the mixing chamber to the aircraft region to be air conditioned via a mixed air line,
establishing a thermal coupling between the aircraft air conditioning system and an external energy source by means of a first heat exchanger, and
transferring cooling energy provided by the external energy source to the aircraft air conditioning system via the first heat exchanger,
wherein a second heat exchanger establishes a thermal coupling to at least one of a refrigerating device and a heat pump and is arranged in at least one of the conditioned air line and a conditioned air branch line, the conditioned air branch line branching off from the conditioned air line and connecting the conditioned air line to the aircraft region to be air conditioned.

* * * * *